United States Patent [19]
Toriyama et al.

[11] Patent Number: 5,837,633
[45] Date of Patent: Nov. 17, 1998

[54] METHOD FOR PRODUCTION OF ALUMINUM NITRIDE SINTERED BODY AND ALUMINUM NITRIDE POWDER

[75] Inventors: Motohiro Toriyama; Kiyoshi Hirao; Masayoshi Ohashi; Syuzo Kanzaki; Masaaki Obata, all of Aichi, Japan

[73] Assignees: Agency of Industrial Science and Technology; Fine Ceramics Research Association, both of Tokyo, Japan

[21] Appl. No.: 741,218

[22] Filed: Oct. 29, 1996

[30] Foreign Application Priority Data

Nov. 2, 1995 [JP] Japan ................................. 7-310140
Aug. 14, 1996 [JP] Japan ................................. 8-232590

[51] Int. Cl.⁶ .................... C01B 21/072; C04B 35/581
[52] U.S. Cl. .................................... 501/98.4; 423/412
[58] Field of Search ........................ 423/412; 501/98.4

[56] References Cited

U.S. PATENT DOCUMENTS

| | | | |
|---|---|---|---|
| 1,366,720 | 1/1921 | De Loisy | 423/412 |
| 3,238,018 | 3/1966 | Winter et al. | 423/412 |
| 3,419,404 | 12/1968 | Mao | 423/412 |
| 3,572,992 | 3/1971 | Komeya et al. | 423/412 |
| 5,167,944 | 12/1992 | Uda et al. | 501/98.4 |
| 5,314,675 | 5/1994 | Dubots | 501/98.4 |
| 5,314,850 | 5/1994 | Miyahara | 501/98.4 |

FOREIGN PATENT DOCUMENTS

| | | | |
|---|---|---|---|
| 1106296 | 5/1961 | Germany | 423/412 |
| 1197437 | 7/1965 | Germany | 423/412 |
| 288502 | 4/1991 | Germany | 423/412 |
| 83607 | 4/1986 | Japan | 423/412 |
| 17210 | 1/1988 | Japan | 423/412 |
| 183407 | 7/1989 | Japan | 423/412 |
| 147909 | 6/1993 | Japan | 423/412 |
| 270810 | 10/1993 | Japan | 423/412 |

OTHER PUBLICATIONS

Materials Science and Technology, vol. 9, pp. 463–474, Jun. 1993, G. Selvaduray, et al., "Aluminum Nitride: Review of Synthesis Methods".
Patent Abstracts of Japan, JP–027522, Jan. 27, 1995.
Material Science, vol. 31, No. 4, pp. 150–156, 1994.
Pulverulent body and powder metallurgy, vol. 41, No. 9, pp. 1095–1098, 1994, Koji Atarashiya, "Reaction Sintering of Aluminum Nitride" (with partial English translation).
Bulletin of the Japanese Metal Society, vol. 29, No. 7, pp. 534–541, 1990.

*Primary Examiner*—Wayne Langel
*Attorney, Agent, or Firm*—Oblon, Spivak, McClelland, Maier & Neustadt, P.C.

[57] ABSTRACT

The present invention provides a method for producing an aluminum nitride sintered body having excellent characteristics and an aluminum nitride powder conveniently and inexpensively. The present invention relates to a method for production of an aluminum nitride sintered body comprising forming a metal aluminum power into a thin-plate like shape, heating the formed body to a temperature not exceeding the melting point of aluminum in a vacuum atmosphere, and then sintering it under $N_2$ pressure (1–150 kg/cm$^2$), and a method for production of an aluminum nitride powder comprising heating a metal aluminum powder to a temperature not exceeding the melting point of aluminum in a vacuum atmosphere, sintering it under $N_2$ pressure (1–150 kg/cm$^2$, and further cooling and pulverizing it.

20 Claims, 1 Drawing Sheet

METHOD FOR PRODUCTION OF ALUMINUM NITRIDE SINTERED BODY AND ALUMINUM NITRIDE POWDER

DESCRIPTION OF THE INVENTION

The present invention relates to a method for production of an aluminium nitride sintered body having excellent characteristics and an aluminium nitride sintered body capable of manufacturing an aluminium nitride powder conveniently and inexpensively, and a method for production of an aluminium nitride powder.

BACKGROUND OF THE INVENTION

Generally, as a method for production of an aluminium nitride sintered body has been known a method comprising adding a small amount of rare-earth oxides such as yttria and the like or alkali-earth oxides such as calcia and the like to an aluminium nitride powder as a sintering auxiliary, and sintering the mixture at a temperature of 1600° to 1900° C. under normal pressure (e.g., Material Science, Vol. 31, No. 4, pp. 150–155 (1994)). In addition, a method of sintering by reacting of an aluminium ultrafine powder in nitrogen has been known (Powders and Powder Metallurgy, Vol. 41, No. 9, pp. 1095–1098 (1994), official gazette of laid-open Japanese Patent Publication No. 2-27522).

However, in normal-pressure sintering process, the process is divided into two stages of the synthesis and the sintering of an aluminium nitride powder, and besides the sintering requires a high temperature of 1600° to 1900° C., and causes a problem of production cost. In addition, the sintering by reaction of an aluminium ultrafine powder has a problem of handling of the ultrafine powder and manufacturing of its product.

Moreover, since an aluminium nitride sintered body is poor in mechanical characteristics such as strength and toughness, as compared with other nitrides such as silicon nitride and the like, it has a problem of reliability. As a means for improving mechanical characteristics can be thought of compounding it with a second component with strong mechanical characteristics such as silicon nitride and silicon carbide and the like; in conventional normal-pressure sintering, however, a reaction between aluminium nitride and an auxiliary, a second component, occurs at sintering at a high temperature, and it has been impossible to make them into a composite product.

As a method for production of an aluminium nitride powder have been known the direct nitridation process, the carbothermal reduction process, the self-combustion synthesis process, the vapor-phase reaction process, the plasma reaction process and the alkoxide process (e.g., Bulletin of the Japanese Metal Society, Vol. 29, No. 7, pp. 534–541 (1990), Materials Science and Technology, June 1993, Vol. 9, pp. 463–473), and the direct nitridation process and the carbothermal reduction process are employed practically as industrial methods for production.

According to the carbothermal reduction process, an aluminium nitride powder comprising uniform particles with a submicron diameter can be produced. In general, the uniformity of particles has influence upon the characteristics of a sintered body to be obtained therefrom; it as been known that an aluminium nitride sintered body synthesized using an aluminium nitride powder synthesized according to the carbothermal reduction process as a material is excellent in such characteristics as thermal conductivity and strength. However, the carbothermal reduction process requires a high temperature of 1400° to 1800° C., and besides requires sintering process to remove surplus carbon, which causes a problem of an increase in the content of oxygen of aluminium nitride.

On the other hand, the direct nitridation process can be performed inexpensively, as compared with the carbothermal reduction process; however, since aluminium particles are fused due to nitridation reaction heat, aluminium nitride obtained agglomerates, and is hard to be pulverized uniformly. As a result, an aluminium nitride powder obtained is not uniform and the particle size distribution thereof becomes broad; hence an aluminium nitride sintered body synthesized using an aluminum nitride powder synthesized according to the direct nitridation process as a material is poor in such characteristics as thermal conductivity and strength, as compared with those employing a powder synthesized according to the carbothermal reduction process.

SUMMARY OF THE INVENTION

The present invention provides a method for producing an aluminium nitride sintered body having excellent characteristics and an aluminium nitride powder conveniently and inexpensively.

The present invention relates to a method for production of an aluminium nitride sintered body comprising forming a metal aluminium power into a thin-plate like share, heating the formed body to a temperature not exceeding the melting point of aluminium in a vacuum atmosphere, and then sintering it under $N_2$ pressure (1–150 kg/cm$^2$), and a method for production of an aluminium nitride powder comprising heating a metal aluminium powder to a temperature not exceeding the melting point of aluminium in a vacuum atmosphere, sintering it under $N_2$ pressure (1–150 kg/cm$^2$), and further cooling and pulverizing it.

According to the present invention, an aluminium nitride sintered body can be obtained directly from a metal aluminium powder, and it can produce an aluminium nitride sintered body with excellent characteristics conveniently and inexpensively, as compared with a conventional method comprising synthesizing an aluminium nitride powder, adding a sintering auxiliary thereto and sintering it.

The present invention can produce an aluminium nitride powder comprising uniform particles with a submicron diameter.

DETAILED DESCRIPTION OF THE INVENTION

Figure 1:
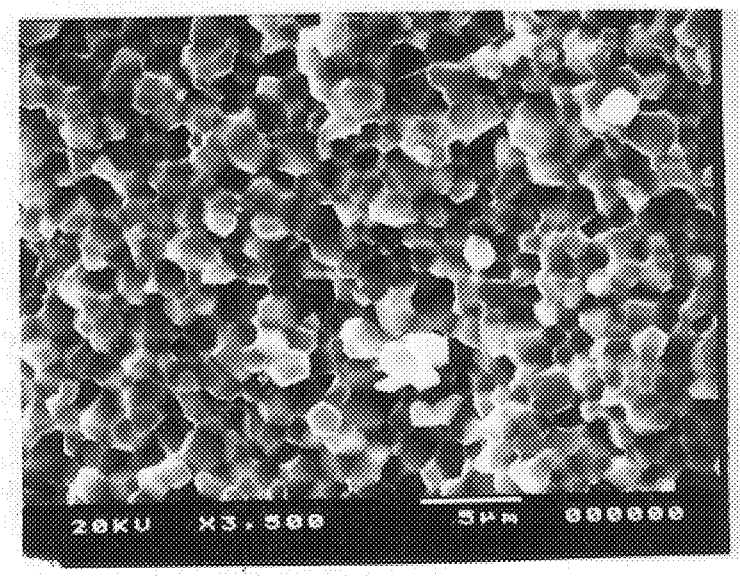
FIG. 1 shows a photograph of the structure of an AlN sintered body (photograph of the structure of a ceramic material) obtained in Examples of the present invention.

Under these circumstances, in view of the above prior arts, the present inventors have engaged in assiduous studies with a view to developing a new method capable of manufacturing an aluminium nitride sintered body and an aluminium nitride powder having excellent characteristics and being free from the above problems in conventional method for production of an aluminium nitride sintered body and an aluminium nitride powder, conveniently and inexpensively, and as a result, have found that the desired object can be accomplished, regarding an aluminium nitride sintered body, by heating a formed body of a metal aluminium powder to a specific temperature in a vacuum atmosphere, and then sintering it under $N_2$ pressure, and regarding an aluminium nitride powder, by heating a metal aluminium powder to a specific temperature in a vacuum atmosphere, sintering it under $N_2$ pressure, and then cooling and pulverizing it, which has led to the accomplishment of the present invention.

That is, it is the object of the present invention to provide a method for production of an aluminium nitride sintered body and an aluminium nitride powder capable of dissolving the above problems in prior arts.

According to the present invention, an aluminium nitride sintered body can be produced conveniently and inexpensively.

In addition, an aluminium nitride powder comprising uniform particles with a submicron diameter can be produced by the direct nitridation process similarly as by the carbothermal reduction process.

It becomes possible thereby to provide an aluminium nitride powder to be used as a material for an aluminium nitride sintered body having excellent characteristic inexpensively.

Moreover, the present invention relates to a reaction at a temperature below the melting point of aluminium, which hardly causes a reaction between aluminium nitride and a second component, and hence a composite sintered body of an aluminium nitride group having excellent mechanical characteristics can be produced by incorporating the second component such as silicon nitride, silicon carbide and silicon and the like into a metal aluminium powder.

The present invention dissolving the above subject relates to (1) a method for production of an aluminium nitride sintered body comprising forming a metal aluminium power into a thin-plate like shape, heating the formed body to a temperature not exceeding the melting point of aluminium in a vacuum atmosphere, and then sintering it under $N_2$ pressure (1–150 kg/cm$^2$), (2) a method for production of an aluminium nitride sintered body comprising forming a metal aluminium power into a thin-plate like shape, heating the formed body to a temperature of 550° to 660° C. in a vacuum atmosphere, maintaining it under $N_2$ pressure (1–150 kg/cm$^2$) for 15 minutes to 24 hours, to sinter it, and (3) a method for production of an aluminium nitride sintered body comprising forming a metal aluminium power into a thin-plate like shape, sintering the formed body according to the above method (1) or (2), and further sintering it under $N_2$ at a temperature of 1700° to 1950° C.

In addition, the present invention relates to, as a preferable embodiment, (4) a method for production of an aluminium nitride sintered body according to the above (1), (2) or (3), wherein 0.1 to 10 mol % of a $Y_2O_3$ powder is incorporated into a metal aluminium powder.

Moreover, the present invention relates to (5) a method for production of an aluminium nitride powder comprising heating a metal aluminium powder to a temperature not exceeding the melting point of aluminium in a vacuum atmosphere, sintering it under $N_2$ pressure (1–150 kg/cm$^2$), and further cooling and pulverizing it, (6) a method for production of an aluminium nitride powder comprising heating a metal aluminium powder to a temperature of 550° to 620° C. in a vacuum atmosphere, maintaining it under $N_2$ pressure (1–150 kg/cm$^2$) for 15 minutes to 24 hours, to sinter it, and further cooling and pulverizing it, (7) a method for production of an aluminium nitride powder, wherein an aluminium nitride powder produced according to the above (5) or (6) is further sintered under $N_2$ at a temperature of 665° to 1500° C., and (8) a method for production of an aluminium nitride powder comprising heating a metal aluminium powder to a temperature of 550° to 620° C. in a vacuum atmosphere, maintaining it under $N_2$ pressure (1–150 kg/cm$^2$) for 15 minutes to 24 hours, to sinter it, and further sintering it in an atmosphere of $N_2$ at a temperature of 665° to 1500° C., cooling it, and pulverizing it.

(1) Production of a Sintered Body

As a metal aluminium powder can be employed a commercially available atomized powder with a particle size of several to several tens of microns, and a specific powder such as an ultrafine powder need not to be employed. As a preferable method for preparing a formed body can be exemplified a method comprising press-forming metal aluminium powder into a formed body with a thickness of about 0.1 to 2 mm, but the method is not restricted thereto, and any thin-plate like shape with a proper form and thickness can be employed.

As a method for forming a metal aluminium powder can be exemplified press forming, sheet forming and extrusion forming; however, there is no particular restriction against it, seating is performed in a vacuum atmosphere as to cause a reaction to being stable. Unless heating is performed in a vacuum atmosphere, nitridation becomes incomplete and the change of the form of a formed body becomes large according to nitridation.

If the temperature at sintering does not reach 550° C., the rate of a nitridation reaction becomes slow, which is not suitable for practical use. If it exceeds 660° C., aluminium melts due to nitridation reaction heat, and nitridation becomes hard to proceed After the temperature is raised to the above temperature (temperature not exceeding the melting point of aluminium, preferably 550° to 660° C.), it is maintained under $N_2$ pressure (1–150 kg/cm$^2$) for 15 minutes to 24 hours to sinter it. The reaction time needs to be adjusted according to the retention temperature, nitrogen pressure, the thickness and density of a formed body and the particle size of a metal aluminium powder; a long time of period is required at a low temperature and a low pressure, and a short time of period is required at a high temperature and a high pressure. A reaction is completed in a shorter time of period as a formed body is thinner, the density of it is smaller and the particle size of a metal aluminium powder is smaller.

As a means of sintering can be exemplified a resistance heating furnace and a high-frequency heating furnace, but there is no particular restriction against it so far as heating in a vacuum atmosphere or under pressure can be performed; however, a furnace composed of a graphite material is suitable from the viewpoint of the stability of a reaction, since reducing power in the furnace can be heightened with it.

A more densified aluminium nitride sintered body can be obtained by further sintering a sintered body sintered at a temperature not exceeding the melting point of aluminium, preferably at a temperature of 550° to 660° C., in an atmosphere of $N_2$ at a temperature of 1700° to 1950° C. for 0.5 to 4 hours.

In the method of the present invention, it is possible to add a rare-earth oxides such as yttria and the like and alkali-earth oxides such as calcia and the like generally employed as a sintering auxiliary into a metal aluminium powder; thereby, an aluminium nitride sintered body having a structure comprising coaxial particles with a diameter of several microns similar to the structure of an ordinary normal-pressure sintered body obtained by adding a sintering auxiliary into aluminium nitride can be obtained. In this case, a method comprising incorporating 0.1 to 10 mol % of a $Y_2O_3$ powder into a metal aluminium powder is exemplified as a preferable one.

(2) Production of an Aluminium Nitride Powder

A metal aluminium powder subjected to nitridation may be used in a state of being filled in a vessel or a formed body, and there is no particular restriction against it; however, taking the easiness of pulverization in a later process into consideration, it is preferable to avoid tight filling and densified forming.

Unless heating is performed in a vacuum atmosphere, nitridation becomes incomplete, and sintering among particles proceeds, which makes pulverization hard. If the temperature of sintering does not reach 550° C., the nitridation rate becomes slow, which is not suitable for practical use. The temperature exceeding the melting point causes the melting of aluminium, and an aluminium nitride agglomerate obtained becomes solid and hard to be pulverized. In order to obtain aluminium nitride to be easily pulverized, it is necessary to perform sintering at a temperature not exceeding the melting point of aluminium. When sintering is performed at a temperature below 620° C., uniform particles with a submicron diameter similar to a powder synthesized according to the carbothermal reduction process can be obtained.

After the temperature is raised to the above temperature (temperature not exceeding the melting point of aluminium, preferably 550° to 620° C.), it is maintained under $N_2$ pressure (1–150 kg/cm$^2$) for 15 minutes to 24 hours to sinter it. The reaction time needs to be adjusted according to the retention temperature, nitrogen pressure, the filling state of a powder, the density of a formed body and the particle size of a metal aluminium powder; a long time of period is required at a low temperature and a low pressure, and a short time of period is required at a high temperature and a high pressure. A reaction is completed in shorter time of period as filling is loose, a formed body has a smaller density and the particle size of a metal aluminium powder is smaller.

As a means of sintering can be exemplified a resistance heating furnace and a high-frequency heating furnace, but there is no particular restriction against it so far as heating in a vacuum atmosphere or under pressure can be performed; however, a furnace composed of a graphite material is suitable from the viewpoint of the stability of a reaction, since reducing power in the furnace can be heightened with it.

Crystallinity can be heightened by further sintering a sintered body sintered at a temperature not exceeding the melting point of aluminium, preferably at a temperature of 550° to 620° C., in an atmosphere of $N_2$ at a temperature of 665° to 1500° C.

After a formed body is sintered, it is cooled and pulverized by a means ordinarily employed for the pulverization of a ceramic powder such as a crasher, a ball mill and a vibration mill to produce an aluminium nitride powder.

Besides, the above sintering in an atmosphere of $N_2$ at a temperature of 665° to 1500° C. may be performed after pulverization.

It has been revealed that the aluminium nitride sintered body obtained by the present invention is AlN according to the assay of the surface composition of it by XRD, and that the nitridation rate is calculated as almost 100% from the increase in weight. According to these results, the obtained aluminium nitride sintered body can be used suitably as a material for a heat-radiating substrate to be used in a semiconductor electron circuit and semiconductor package.

Next, the present invention will be described in details according to Examples, but the present invention is not restricted to said Examples.

EXAMPLES 1–12

A metal aluminium powder (0.16 g) (AH-2505 manufactured by Toyo Alumi Industry Co., Ltd.) was press-formed into a formed body with a thickness of 0.75 mm and a diameter of 12 mm, and the formed body was sintered under the conditions shown in Table 1. The surface composition of the obtained sintered body was AlN according to the assay by XRD (RAD-RB type manufactured by Rigaku Denki). The nitridation rate calculated frog the increase in weight was 100%.

TABLE 1

| Example (No.) | Heating atmosphere | Heating rate (°C./min) | Temperature maintained (°C.) | Time maintained (hrs) | $N_2$ pressure (kg/cm$^2$) |
|---|---|---|---|---|---|
| 1 | Vacuum | 10 | 550 | 24 | 10 |
| 2 | Vacuum | 10 | 550 | 24 | 50 |
| 3 | Vacuum | 10 | 575 | 16 | 10 |
| 4 | Vacuum | 10 | 575 | 12 | 50 |
| 5 | Vacuum | 10 | 600 | 4 | 10 |
| 6 | Vacuum | 10 | 600 | 2 | 50 |
| 7 | Vacuum | 10 | 600 | 1 | 100 |
| 8 | Vacuum | 10 | 625 | 2 | 10 |
| 9 | Vacuum | 10 | 625 | 1 | 50 |
| 10 | Vacuum | 10 | 625 | 0.5 | 100 |
| 11 | Vacuum | 10 | 660 | 1 | 10 |
| 12 | Vacuum | 10 | 660 | 0.25 | 50 |

COMPARATIVE EXAMPLES 1–3

A metal aluminium powder (0.16 g) (AH-2505 manufactured by Toyo Alumi Industry Co., Ltd.) was press-formed into a formed body with a thickness of 0.75 mm and a diameter of 12 mm, and the formed body was sintered under the conditions shown in Table 1. As a result of calculating the nitridation rate from the increase in weight, the results shown in Table 2 were obtained.

TABLE 2

| Comp. Ex. (No.) | Heating atmosphere | Heating rate (°C./min) | Temperature maintained (°C.) | Time maintained (hrs) | $N_2$ pressure (kg/cm$^2$) | Nitridation rate (%) |
|---|---|---|---|---|---|---|
| 1 | $N_2$ | 10 | 625 | 2 | 10 | 50 |
| 2 | Vacuum | 10 | 540 | 24 | 50 | 20 |
| 3 | Vacuum | 10 | 663 | 1 | 50 | 10 |

EXAMPLE 13

A mixed powder (0.16 g) obtained by incorporating 1 mol% of $Y_2O_3$ (manufactured by Shin-Etsu Chemical Co., Ltd., purity: 4N) into a metal aluminium powder (AH-2505 manufactured by Toyo Alumi Industry Co., Ltd.) was press-formed into a formed body with a thickness of 0.75 mm and a diameter of 12 mm. The formed body was heated to 625° C. in a vacuum atmosphere at a heating rate of 10° C./min., and then maintained under $N_2$ pressure of 10 kg/cm$^2$ for 2 hours. The surface composition of the obtained sintered body was AlN according to the assay by XRD. The sintered body was subsequently sintered in an atmosphere of $N_2$ at 1900° C. for 2 hours. As a result of examining the structure of the obtained sintered body, it was revealed that it had a structure comprising coaxial particles with a diameter of several microns similar to the structure of an ordinary normal-pressure sintered body. A photograph of the structure of the AlN sintered body obtained in the present Example is shown in FIG. 1.

When sintering was performed in an atmosphere of $N_2$ at a prescribed temperature (1700°–1950° C.) in the same manner, almost the same results were obtained.

EXAMPLES 14–24

Six grams of a metal aluminium powder (AH-2505 manufactured by Toyo Alumi Industry Co., Ltd.) were fed into a carbon vessel with a length of 3 cm, a width of 3 cm and a depth of 1.5 cm to a height from the bottom of 1 cm, and sintered under the conditions shown in Table 3. The obtained sintered body was taken out of the carbon vessel and pulverized in an agate mortar; the structure thereof was AlN according to the assay by XRD. Further as a result of examining the form of the obtained pulverized powder by SEM, the results shown in Table 3 were obtained.

it is a method being excellent in efficiency and inexpensiveness particularly as compared with a conventional method comprising synthesizing an aluminium nitride powder, adding a sintering auxiliary thereto and sintering it.

In addition, since the present invention can avoid a problem of a reaction between aluminium nitride and a second component, which occurred in a conventional normal-pressure sintering method, it is possible to compound a second component with strong mechanical characteristics and to produce a composite sintered body of an aluminium nitride group excellent in mechanical characteristics such as strength and toughness.

An aluminium nitride sintered body related to the present invention is useful as a material for a heat-radiating substrate to be used for a semiconductor electron circuit and semiconductor package.

Moreover, according to a method for production of an aluminium nitride powder according to the present invention, an aluminium nitride powder comprising uniform particles with a submicron diameter can be produced conveniently. Thereby, an aluminium nitride powder capable of being used as a raw material for an aluminium nitride sintered body with excellent characteristics can be provided inexpensively.

TABLE 3

| Ex. (No.) | Heating atmosphere | Heating rate (°C./min) | Temperature maintained (°C.) | Time maintained (hrs) | $N_2$ pressure (kg/cm$^2$) | Composition | Form |
| --- | --- | --- | --- | --- | --- | --- | --- |
| 14 | Vacuum | 10 | 550 | 24 | 10 | AlN | Particulate |
| 15 | Vacuum | 10 | 550 | 24 | 50 | AlN | Particulate |
| 16 | Vacuum | 10 | 575 | 16 | 10 | AlN | Particulate |
| 17 | Vacuum | 10 | 575 | 12 | 50 | AlN | Particulate |
| 18 | Vacuum | 10 | 600 | 4 | 10 | AlN | Particulate |
| 19 | Vacuum | 10 | 600 | 2 | 50 | AlN | Particulate |
| 20 | Vacuum | 10 | 600 | 2 | 100 | AlN | Particulate |
| 21 | Vacuum | 10 | 620 | 2 | 10 | AlN | Particulate |
| 22 | Vacuum | 10 | 620 | 1 | 50 | AlN | Particulate |
| 23 | Vacuum | 10 | 620 | 1 | 100 | AlN | Particulate |
| 24 | Vacuum | 10 | 660 | 0.5 | 10 | AlN | Irregular |

COMPARATIVE EXAMPLES 4–5

Six grams of a metal aluminium powder (AH-2505 manufactured by Toyo Alumi Industry Co., Ltd.) were fed into a carbon vessel with a length of 3 cm, a width of 3 and a depth of 1.5 cm to a height from the bottom of 1 cm, and sintered under the conditions shown in Table 4. The obtained sintered body was taken out of the carbon vessel and pulverized in an agate mortar; the structure thereof was Al and AlN according to the assay by XRD.

What is claimed is:

1. A method for producing aluminum nitride, comprising:
   heating aluminum metal powder in a vacuum to a temperature in the range of 550° C. to the melting point of aluminum; and then
   nitriding said aluminum metal powder under $N_2$ pressure of at least 1 kg/cm$^2$ at a temperature in the range of 550° C. to the melting point of aluminum.

2. The method of claim 1, further comprising forming said aluminum metal powder into a shape.

TABLE 4

| Comp. Ex. (No.) | Heating atmosphere | Heating rate (°C./min) | Temperature maintained (°C.) | Time maintained (hrs) | $N_2$ pressure (kg/cm$^2$) | Composition |
| --- | --- | --- | --- | --- | --- | --- |
| 4 | $N_2$ | 10 | 600 | 2 | 50 | Al > AlN |
| 5 | Vacuum | 10 | 670 | 2 | 50 | Al > AlN |

The present invention relates to a method for producing an aluminium nitride sintered body directly from a metal aluminium powder, and can produce an aluminium nitride sintered body conveniently and inexpensively as compared with a conventional method. The present invention requires no process of synthesizing an aluminium nitride powder, and 3. The method of claim 2, wherein said heating in a vacuum is to a temperature in the range of 550°–660° C.

4. The method of claim 3, wherein said nitriding is carried out for 15 minutes to 24 hours.

5. The method of claim 4, wherein said nitriding is under $N_2$ pressure of 1–150 kg/cm$^2$.

6. The method of claim 2, further comprising sintering said nitrided aluminum metal powder in an atmosphere comprising $N_2$ at a temperature of 1700°–1950° C.

7. The method of claim 2, further comprising incorporating 0.1–10 mol % of $Y_2O_3$ powder into said aluminum metal powder.

8. The method of claim 3, further comprising incorporating 0.1–10 mol % of $Y_2O_3$ powder into said aluminum metal powder.

9. The method of claim 6, further comprising incorporating 0.1–10 mol % of $Y_2O_3$ powder into said aluminum metal powder.

10. The method of claim 1, further comprising cooling and pulverizing said nitrided aluminum metal powder.

11. The method of claim 10, wherein said heating in a vacuum is to a temperature in the range of 550°–620° C.

12. The method of claim 11, wherein said nitriding is carried out for 15 minutes to 24 hours.

13. The method of claim 12, wherein said nitriding is under $N_2$ pressure of 1–150 $kg/cm^2$.

14. The method of claim 10, further comprising sintering said nitrided aluminum metal powder in an atmosphere comprising $N_2$ at a temperature of 665°–1500° C.

15. The method of claim 11, further comprising sintering said nitrided aluminum metal powder in an atmosphere comprising $N_2$ at a temperature of 665°–1500° C.

16. The method of claim 12, further comprising sintering said nitrided aluminum metal powder in an atmosphere comprising $N_2$ at a temperature of 665°–1500° C.

17. In a method for producing an aluminum nitride sintered body from aluminum metal powder, including forming aluminum metal powder into a shape and nitriding the aluminum metal powder with $N_2$, the improvement comprising heating the formed aluminum metal powder in a vacuum to a temperature in the range of 550° C. to the melting point of aluminum; and then nitriding said formed aluminum metal powder under $N_2$ pressure of at least 1 $kg/cm^2$ at a temperature in the range of 550° C. to the melting point of aluminum.

18. The method of claim 17, wherein said heating under vacuum is at a temperature in the range of 550°–660° C., and said improvement further comprises incorporating $Y_2O_3$ powder into said aluminum metal powder prior to said forming.

19. In a method for producing aluminum nitride powder from aluminum metal powder, including nitriding aluminum metal powder with nitrogen gas, cooling and pulverizing the nitrided aluminum metal powder, the improvement comprising heating said aluminum metal powder in a vacuum to a temperature in the range of 550° C. to the melting point of aluminum; and then nitriding said aluminum metal powder under $N_2$ pressure of at least 1 $kg/cm^2$ at a temperature in the range of 550° C. to the melting point of aluminum.

20. The method of claim 19, wherein said heating in a vacuum is at a temperature in the range of 550°–620° C., and the improvement further comprises sintering the nitrided aluminum metal powder in an atmosphere comprising $N_2$ at a temperature of 665°–1500° C.

* * * * *

UNITED STATES PATENT AND TRADEMARK OFFICE
CERTIFICATE OF CORRECTION

PATENT NO. : 5,837,633
DATED : November 17, 1998
INVENTOR(S) : Motohiro TORIYAMA et al.

It is certified that error appears in the above-identified patent and that said Letters Patent is hereby corrected as shown below:

On the title page, and at the top of Column 1, item [54], the Title should read:

--METHOD FOR PRODUCTION OF ALUMINIUM NITRIDE SINTERED BODY AND ALUMINIUM NITRIDE POWDER--

On the title page, item [73], the first Assignee should read:

--Japan as represented by Director General of Agency of Industrial Science and Technology;--

Signed and Sealed this

Thirteenth Day of July, 1999

*Attest:*

Q. TODD DICKINSON

*Attesting Officer*  Acting Commissioner of Patents and Trademarks